United States Patent [19]
Kodama et al.

[11] Patent Number: 5,937,911
[45] Date of Patent: Aug. 17, 1999

[54] FUEL TRANSPORTING HOSE HAVING RESIN TUBE OF FLUORINE-CONTAINED RESIN LAYER AND OTHER SYNTHETIC RESIN LAYER, AND PROCESS OF PRODUCING THE RESIN TUBE

[75] Inventors: Tsutomu Kodama, Komaki; Kazuhiro Kato, Nagoya, both of Japan

[73] Assignee: Tokai Rubber Industries, Ltd., Japan

[21] Appl. No.: 08/658,107

[22] Filed: Jun. 4, 1996

Related U.S. Application Data

[63] Continuation of application No. 08/037,006, Mar. 25, 1993, abandoned.

[30] Foreign Application Priority Data

Mar. 30, 1992 [JP] Japan .................................. 4-106050

[51] Int. Cl.$^6$ ...................................................... F16L 11/08
[52] U.S. Cl. .......................... 138/137; 138/141; 138/124; 138/125; 138/DIG. 3
[58] Field of Search .................................... 138/137, 140, 138/123–126, 141, DIG. 3, 178, 103; 361/215; 174/47

[56] References Cited

U.S. PATENT DOCUMENTS

| | | | |
|---|---|---|---|
| Re. 32,230 | 8/1986 | Satoh et al. | 138/126 |
| 3,166,688 | 1/1965 | Rowand et al. | 317/2 |
| 3,473,087 | 10/1969 | Slade | 317/2 |
| 3,547,162 | 12/1970 | Schaerer . | |
| 3,658,976 | 4/1972 | Slade . | |
| 3,828,112 | 8/1974 | Johansen et al. | 174/47 |
| 4,059,847 | 11/1977 | Phillips et al. | 361/215 |
| 4,196,464 | 4/1980 | Russell | 361/215 |
| 4,215,177 | 7/1980 | Strassel | 428/413 |
| 4,272,585 | 6/1981 | Strassel | 428/413 |
| 4,330,017 | 5/1982 | Satoh et al. . | |
| 4,394,705 | 7/1983 | Blachman | 361/215 |
| 4,603,712 | 8/1986 | Krause | 138/137 |

(List continued on next page.)

FOREIGN PATENT DOCUMENTS

| | | | |
|---|---|---|---|
| 0385731 | 9/1990 | European Pat. Off. . | |
| 470606 | 2/1992 | European Pat. Off. | F16L 11/12 |
| 523644 | 1/1993 | European Pat. Off. | B32B 27/08 |
| 551094 | 7/1993 | European Pat. Off. | B32B 7/04 |
| 558373 | 9/1993 | European Pat. Off. | F16L 9/133 |
| 2602515 | 2/1988 | France | C08L 27/16 |
| 1779905 | 2/1972 | Germany . | |
| 4001227 | 7/1990 | Germany | F16L 11/12 |
| 4006870 | 7/1991 | Germany | F16L 9/12 |
| 62-171581 | 7/1987 | Japan | F16L 11/04 |
| 1037306 | 7/1966 | United Kingdom | C08F 29/16 |

OTHER PUBLICATIONS

Database WPI, Section Ch, Week 8543, Derwent Publications Ltd., London, Gb; Class A88, AN 85–266835 & JP–A–60 179 242 (Tokai Rubber Ind KK) Sep. 13, 1985.

Database WPI, Section Ch, Week 8133, Derwent Publications Ltd., London, GB; Class A88, AN 81–56965D & SE–A–7 908 974 (Wiro AB) Jun. 9, 1981.

Patent Abastracts of Japan, vol. 016, No. 111 (M–1223) Mar. 18, 1992.

*Primary Examiner*—Patrick Brinson
*Attorney, Agent, or Firm*—Parkhurst & Wendel, L.L.P.

[57] ABSTRACT

A fuel transporting hose used in a fuel pipe system is disclosed. The hose includes: an inner layer made of a fluorine-contained resin; an intermediate layer made of a synthetic resin other than the fluorine-contained resin and formed on the inner layer; and an outer layer made of a rubber material and formed on the intermediate layer. The inner layer may have electrical conductivity. Also disclosed is a resin tube in a fuel pipe system, which has at least an inner layer made of a fluorine-contained resin, and an outer layer made of a polyamide or polyester resin. In producing the resin tube, an outer surface of the inner layer which contacts the outer layer is subjected to a surface treatment for improving the adhesive strength between the inner and outer layers, and the inner and outer layers formed in lamination are subjected to a heat treatment at a temperature in a range of 150° C. to a melting point of the outer layer.

26 Claims, 1 Drawing Sheet

U.S. PATENT DOCUMENTS

| | | | |
|---|---|---|---|
| 4,706,713 | 11/1987 | Sadamitsu et al. | 138/137 |
| 4,762,589 | 8/1988 | Akiyama et al. | 156/307.3 |
| 4,800,109 | 1/1989 | Washizu | 428/34.9 |
| 4,862,923 | 9/1989 | Kitami et al. | 138/125 |
| 4,905,734 | 3/1990 | Ito | 138/126 |
| 4,907,625 | 3/1990 | Ito et al. | 138/126 |
| 4,942,906 | 7/1990 | Igarashi et al. | 138/126 |
| 4,984,604 | 1/1991 | Nishimura | 138/126 |
| 5,170,011 | 12/1992 | Martucci | 174/47 |
| 5,219,003 | 6/1993 | Kerschbaumer | 138/137 |
| 5,284,184 | 2/1994 | Noone et al. | 138/121 |
| 5,419,374 | 5/1995 | Nawrot et al. | 138/137 |

FUEL TRANSPORTING HOSE HAVING RESIN TUBE OF FLUORINE-CONTAINED RESIN LAYER AND OTHER SYNTHETIC RESIN LAYER, AND PROCESS OF PRODUCING THE RESIN TUBE

This is a Continuing Application of Ser. No. 08/037,006 filed Mar. 25, 1993 now abandoned.

BACKGROUND OF THE INVENTION

1. Field of the Invention

The present invention relates generally to a fuel transporting hose that is suitably used in a fuel pipe system of an automobile for transporting a liquid such as gasoline or a gas. The invention is also concerned with a resin tube incorporated in the hose, which tube has a laminar structure that consists of a layer made of fluorine-contained resin or fluororesin, and a layer made of polyamide or other resin that has a poor adhesive property with respect to the fluorine-contained resin.

2. Discussion of the Related Art

There are known various kinds of hoses made of various materials, for use in a fuel pipe system of an automobile or other vehicle. Such hoses may be used as a fuel pipe itself or as a connector for connecting fuel pipes. For example, there is known a hose (A) which consists of: an innermost layer made of fluororubber (FKM); an intermediate layer formed on the innermost layer and made of a rubber material, such as a copolymer of epichlorohydrin-ethylene oxide-allylglycidyl ether (ECO), acrylonitrile-butadiene rubber (NBR), and chlorosulphonated polyethylene (CSM); an outermost layer formed on the intermediate layer and made of ECO or CSM; and a reinforcing layer formed between the intermediate layer and the outermost layer, by braided reinforcing fibers.

There has been also proposed a hose (B) adapted for transporting town gas or other gas, as disclosed in JP-A-62-171581, which includes: an innermost layer made of a fluorine-contained resin; an intermediate layer formed on the innermost layer and made of a rubber material; and an outermost layer formed on the intermediate layer and made of a rubber material such as ethylene-propylene-diene rubber (EPDM). The hose of this type receives a considerably high pressure during its use, when used for transporting a liquefied natural gas, for example. To improve the pressure resistance, therefore, the hose further includes a reinforcing layer consisting of a brass-plated wire and formed between the intermediate layer and the outermost layer.

The above-described hose (A) has excellent properties required for its use in a fuel pipe system of an automobile, which properties include the resistance to sour gasoline which contains peroxides produced upon oxidization of gasoline at a high temperature, and the ability to prevent permeation of gasoline therethrough, in other words, gasoline impermeability. In producing the hose (A), however, each layer of the hose needs to be formed with a sufficiently large thickness, which requires a large amount of expensive fluororubber to be used for the innermost layer, resulting in an increased cost of manufacture of the hose. Further, the process of producing the hose (A) includes a series of cumbersome steps, e.g., extrusion-braiding-extrusion-vulcanization. If the above-described hose (B) is used in a fuel pipe system of an automobile, on the other hand, the hose, which has an increased heat transfer coefficient due to the reinforcing layer in the form of a metallic wire, may catch fire, and the heat generated by the fire may be transmitted to gasoline passing through the hose, thereby causing firing and explosion, and other problems.

Other than the rubber hoses as described above, a metallic tube, a resin tube or the like has been also used as a fuel pipe of an automobile or a connector for such fuel pipes. However, the metallic tube suffers from rusting, and is considerably heavy in weight, which is incompatible with the recent requirement for lightweight vehicles. In recent years, therefore, resin tubes, such as those made of polyamide or polyester resin, are widely and increasingly used in automobiles, since such tubes are lightweight and free from rusting.

For example, there is known a fuel transporting hose which consists of a single layer made of a polyamide resin. However, the hose consisting solely of a polyamide resin layer has unsatisfactory resistance to sour gasoline, gasoline impermeability, resistance to wear due to its contact with other hoses upon installation thereof (hereinafter referred to as "wear resistance"), and resistance to shocks such as that caused by stones hit by the automobile during its running (hereinafter referred to as "shock resistance"). Further, the inner wall of the hose of this type tends to be electrically charged, due to static electricity caused by friction between the inner wall and a fuel liquid such as gasoline. If a voltage higher than a given level appears across the hose, sparks may take place between the hose and metallic parts of a vehicle body, for example, and the sparks may form holes through the hose, or may cause the fuel to take fire. Thus, the known hose is also unsatisfactory in the resistance to firing.

As described above, the single-layer tube made of a polyamide resin is undesirably highly permeable to gasoline, causing problems of environmental contamination. It is accordingly proposed to provide a tube having a double-layered structure which consists of an outer layer formed of polyamide or other resin, and an inner layer formed of fluorine-contained resin which is highly resistant to gasoline, to thereby reduce the amount of permeation of gasoline through the tube. However, the tube of this type may suffer from peeling of the inner and outer layers during its use, due to poor adhesive strength between the fluorine-contained resin and polyamide or other resin. Consequently, the tube may be closed or choked, or may burst due to a gas that is accumulated or trapped between the inner and outer layers.

To improve the adhesive strength between the inner and outer resin layers of the tube, it is known to effect a suitable surface treatment on the outer surface of the fluorine-contained resin layer which contacts the outer layer made of polyamide or other resin. As specific examples of the adhesive surface treatment, there are known various methods such as: sodium treatment using a chemical treatment liquid for introducing an active group (substituent) into the surface of the fluorine-contained resin layer; flame treatment using a flame for fusing the surface of the fluorine-contained resin layer; corona discharge method; and sputtering. However, these adhesive surface treatments have been found unsatisfactory to ensure a sufficiently high adhesive strength between the inner and outer resin layers.

It is also known to carry out a primer treatment after the adhesive surface treatment as described above, so as to improve the adhesive strength. In this case, however, the manufacturing process is undesirably complicated, and the cost of manufacturing of the resin tube is considerably increased due to an increased cost required for materials and installation associated with the primer treatment.

SUMMARY OF THE INVENTION

It is therefore a first object of the present invention to provide a fuel transporting hose used in a fuel pipe system of an automobile, which has excellent properties in respect of the resistance to sour gasoline, the gasoline impermeability and the flame resistance, and which can be produced at a reduced cost without requiring cumbersome process steps.

It is a second object of the invention to provide a fuel transporting hose used in a fuel pipe system of an automobile, which has excellent properties with respect to the resistance to firing, as well as the resistance to sour gasoline, gasoline impermeability, wear resistance and shock resistance.

It is a third object of the invention to provide a resin tube having a laminar structure including a fluorine-contained resin layer and a polyamide or other resin layer, which tube exhibits a significantly improved adhesive strength between the resin layers, and which is free from peeling or separation of the layers.

It is a fourth object of the invention to provide a process of producing such a resin tube as described above.

The above first object of the invention may be attained according to a first aspect of the invention, which provides a fuel transporting hose used in a fuel pipe system, comprising: an inner layer made of a fluorine-contained resin; an intermediate layer made of a synthetic resin other than the fluorine-contained resin and formed on an outer surface of the inner layer; and an outer layer made of a rubber material and formed on an outer surface of the intermediate layer.

The fuel transporting hose constructed as described above, which includes the intermediate layer made of the synthetic resin other than the fluorine-contained resin, assures a sufficiently high pressure resistance or other strength, even though the inner layer made of the fluorine-contained resin has a relatively small thickness. This also leads to reduction of the amount of expensive fluorine-contained resin to be used, resulting in a reduced cost of manufacturing of the hose. Further, the present hose can be produced only by extrusion steps for respective layers, and thus does not require cumbersome process steps, resulting in a further reduced manufacturing cost. The present fuel transporting hose is also excellent with respect to gasoline impermeability, resistance to sour gasoline and flame resistance.

The above-indicated second object of the invention may be attained according to a second aspect of the invention, which provides a fuel transporting hose used in a fuel pipe system, including an electrically conductive innermost layer formed of a synthetic resin.

Studies were conducted by the present inventors on a means for preventing electric charging of the inner wall of the hose, which is a cause of spark of a conventional fuel transporting hose. As a result of the studies, it was revealed that if electrical conductivity is given to an innermost layer of the hose which contacts with the fuel, the static electricity which occurs due to friction between the fuel and the inner wall of the hose escapes through the opposite ends of the hose. Consequently, the inner wall of the hose is not charged, thus avoiding occurrence of spark due to the static electricity. Thus, the present fuel transporting hose has excellent resistance to firing.

The above-indicated third object of the invention may be attained according to a third aspect of the invention, which provides a resin tube used in a fuel pipe system, including at least an inner layer made of a fluorine-contained resin, and an outer layer made of a resin, such as polyamide or polyester resin, which has an insufficient adhesive property with respect to the fluorine-contained resin, wherein an outer surface of the inner layer which contacts the outer layer is subjected to a surface treatment for improving the adhesive strength between the inner and outer layers, and wherein the inner and outer layers formed in lamination are subjected to a heat treatment at a temperature in a range of 150° C. to a melting point of the outer layer.

The above-indicated fourth object of the invention may be attained according to a fourth aspect of the invention, which provides a process of producing a resin tube used in a fuel pipe system, the resin tube having at least an inner layer made of a fluorine-contained resin, and an outer layer made of a resin, such as polyamide and polyester resin, which has an insufficient adhesive property with respect to the fluorine-contained resin, comprising the steps of: forming the inner layer of the fluorine-contained resin; carrying out a surface treatment on an outer surface of the inner layer which is to contact the outer layer, so as to improve the adhesive strength between the inner and outer layers; forming the outer layer on the outer surface of the inner layer; and carrying out a heat treatment in which the inner and outer layers formed in lamination are heated at a temperature in a range of 150° C. to a melting point of the outer layer.

Since the resin tube produced according to the present invention is subjected to the heat treatment as well as the adhesive surface treatment, the adhesive strength between the inner fluorine-contained resin layer and the outer polyamide or polyester resin layer is significantly enhanced, as compared with a conventional tube which is subjected only to the adhesive surface treatment. Accordingly, the present resin tube is advantageously free from peeling or separation of the inner and outer layers, assuring a significantly improved bending stability, and improved durability with respect to vibrations, bending forces or the like. Further, the present resin tube does not suffer from gas accumulation at the interface of the inner and outer layers, and is therefore effectively prevented from bursting. Since the heat treatment can be easily effected at a relatively low cost, the process of producing the resin tube may readily include the step for the heat treatment, without lowering the production efficiency or pushing up the manufacturing cost.

According to a fifth aspect of the present invention, there is provided a resin tube used in a fuel pipe system, comprising an inner layer made of a fluorine-contained resin, and an outer layer made of a synthetic resin other than the fluorine-contained resin and formed on an outer surface of the inner layer.

DETAILED DESCRIPTION OF THE INVENTION

There will be described in detail one preferred embodiment of the present invention, in the form of a fuel transporting hose used in a fuel pipe system of an automobile.

The instant fuel transporting hose includes an innermost layer and an intermediate layer which are both made of synthetic resin. The innermost layer of the hose may be given electrical conductivity. More specifically, the fuel transporting hose consists of an inner layer made of a fluorine-contained resin, an intermediate layer formed on the outer surface of the inner layer and made of a synthetic resin other than the fluorine-contained resin, and an outer layer formed on the outer surface of the intermediate layer and made of a rubber material. The fluorine-contained resin for the inner layer may be given electrical conductivity.

The fluorine-contained resin or fluororesin used for forming the inner layer of the hose may be selected from polyvinylidene fluoride (PVDF); polychlorotrifluoroethylene (CTFE); a copolymer of ethylene and chlorotrifluoroethylene (ECTFE); a copolymer of ethylene and tetrafluoroethylene (ETFE); a copolymer of hexafluoropropylene and tetrafluoroethylene (FEP); fluorinated alkoxyethylene resin (PFA); and polytetrafluoroethylene (PTFE).

The above-indicated fluorine-contained resin may contain an electrically conductive additive dispersed therein, such that the inner layer has a volume resistivity of not higher than $10^{10}\Omega\cdot cm$. The electrically conductive additive may be selected from carbon black, fine stainless steel fibers, and others.

The above-indicated synthetic resin used for forming the intermediate layer may be polyamide or polyester resin, for example. The polyamide resin may be either aliphatic or aromatic, and selected from known substances such as: a polymer of lactam; a condensate of diamine and dicarboxylic acid; a polymer of amino acid; and copolymers and blends of these substances. Specific examples of such polyamide resin include nylon 6, nylon 11, nylon 12, nylon 610, nylon 612, and a blend of nylon 11 or nylon 12 and nylon 66.

The polyester resin is formed according to a known method, by condensation polymerization of polyhydric alcohol and polybasic acid, e.g., diol and dicarboxylic acid.

The diol usually used for forming the polyester resin may be selected from: ethylene glycol; propylene glycol; 1,4-butanediol; neopentyl glycol; cyclohexanediol; xylylene glycol; hexahydroxylylene glycol; and bis(4-β-hydroxyethoxyphenyl)sulfone.

The dicarboxylic acid usually used for forming the polyster resin may be selected from: aromatic dicarboxylic acids such as terephthalic acid, isophthalic acid, phthalic acid, 2,6-naphthalenedicarboxylic acid, and 4,4-diphenyleneetherdicarboxylic acid; and aliphatic dicarboxylic acids such as malonic acid, succinic acid, glutaric acid, adipic acid, sebacic acid, undecanedioic acid, dodecanedioic acid; tridecanedioic acid, tetradecanedioic acid, hexadecanedioic acid, hexadecenedioic acid, octadecanedioic acid, octadecenedioic acid, eicosanedioic acid, eicosenedioic acid, and 1,10-dodecane dicarboxylic acid.

In particular, polybutylene terephthalate (PBT), which is a condensation polymer of 1,4-butanediol and terephthalic acid, is preferably used as the polyester resin.

The rubber material used for forming the outer layer may be selected from: ECO; CSM; chlorinated polyethylene rubber (CPE); acrylic rubber (ACM); chloroprene rubber (CR); a blend of NBR and polyvinyl chloride resin (PVC); EPDM; isobutylene-isoprene rubber (IIR); and halogenated butyl rubber.

The instant fuel transporting hose used in a fuel pipe system of an automobile may be produced in the following manner, using the resin or rubber materials as described above. Initially, a tubular body which gives the inner layer is formed by extruding the fluorine-contained resin from an extruder onto a mandrel. Then, the synthetic resin other than the fluorine-contained resin is extruded on the outer surface of the tubular body (inner layer), to form the intermediate layer thereon. Then, the rubber material for forming the outer layer is extruded on the outer surface of the intermediate layer. These inner, intermediate and outer layers are then formed into an integral structure by heat and vulcanization, and pulled out of the mandrel. Thus, a three-layered hose for used in a fuel pipe system of an automobile is produced. The hose may also be produced without using the mandrel. It is also possible to concurrently extrude the above three layers, to provide the three-layered hose structure. The vulcanization as described above is generally effected for 30–60 min. at a temperature of 150–160° C. If the inner layer contains the above-indicated electrically conductive additive, the content of the conductive additive is preferably determined so that the inner layer has a volume resistivity of not higher than $10^{10}\Omega\cdot cm$. For instance, the inner layer contains 3–16 parts by weight of the conductive additive, per 100 parts by weight of the fluorine-contained resin.

Figure 1:
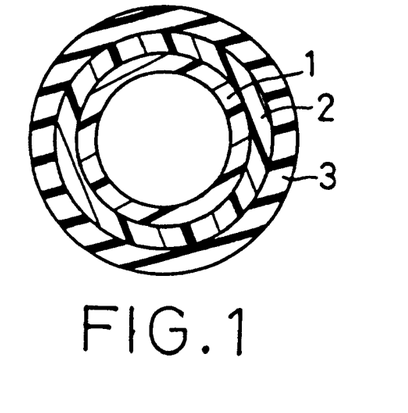
FIG. 1 is a cross sectional view of one embodiment of the present invention, in the form of a fuel transporting hose used in a fuel pipe system of an automobile.

The thus obtained fuel transporting hose is illustrated in FIG. 1, which consists of the inner layer 1 formed of the fluorine-contained resin, the intermediate layer 2 formed of the synthetic resin other than the fluorine-contained resin, and the outer layer 3 formed of the rubber material. The thickness of the inner layer 1 is preferably within a range of 50 μm–0.5 mm, more preferably 0.2±0.1 mm, and the thickness of the intermediate layer 2 is preferably within a range of 0.6–1.2 mm, more preferably 0.8±0.2 mm. The thickness of the outer layer 3 is preferably within a range of 0.5–5 mm, more preferably 2±1 mm. Since the inner layer 1 made of the fluorine-contained resin has a significantly reduced thickness, the present hose may be produced at an accordingly reduced cost. Further, the intermediate layer 2 made of the synthetic resin gives the hose a sufficiently high strength, even though the inner layer 1 is formed with such a small thickness.

The thus obtained fuel transporting hose for use in a fuel pipe system of an automobile has sufficiently high degrees of gasoline impermeability and resistance to sour gasoline, since the fluorine-contained resin is used for the inner layer 1. With the intermediate layer 2 and the outer layer 3 formed of the respective materials as described above, the instant hose is also given significantly improved strength, and high degrees of wear resistance and shock resistance. Further, the three-layered hose structure can be obtained with an effectively reduced thickness of the inner layer 1 made of expensive fluorine-contained resin, with a result of reduction in the manufacturing cost. Moreover, the hose having a simple three-layered structure can be produced without requiring cumbersome process steps, leading to further reduction in the manufacturing cost.

Figure 2:
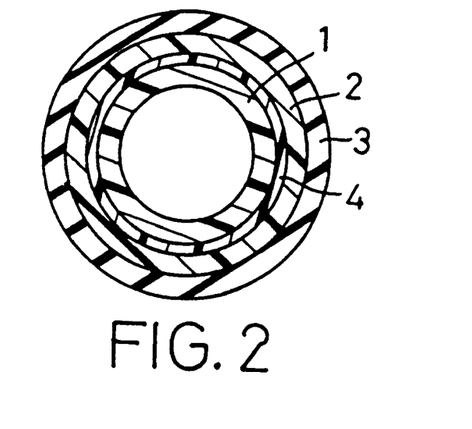
FIG. 2 is a cross sectional view showing another embodiment of the fuel transporting hose of the present invention.

Referring next to FIG. 2, there is shown another embodiment of the fuel transporting hose of the present invention, which includes an adhesive layer 4 formed between the inner layer 1 made of the fluorine-contained resin, and the intermediate layer 2 made of the synthetic resin other than the fluorine-contained resin. This adhesive layer 4 serves to improve the adhesive strength between the inner and intermediate layers 1, 2, and may be formed of a blend of the fluorine-contained resin and polyamide resin, for example. The adhesive layer 4 is usually formed on the inner layer 1 by coating. Alternatively, the inner layer 1, adhesive layer 4 and intermediate layer 2 are concurrently extruded to form a laminar structure.

Figure 3:
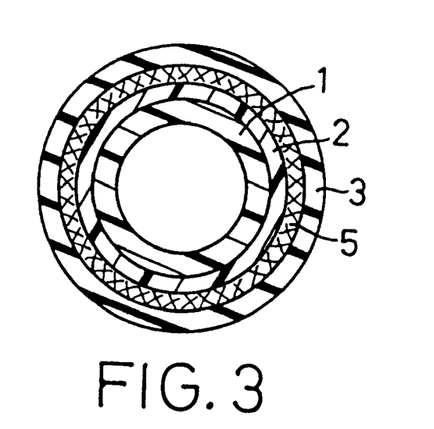
FIG. 3 is a cross sectional view showing a further embodiment of the fuel transporting hose of the present invention.

FIG. 3 illustrates still another embodiment of the fuel transporting hose of the present invention, which includes a reinforcing layer 5 that is formed between the intermediate layer 2 and the outer layer 3, so as to enhance the strength of the hose. The reinforcing layer 5 is formed by braiding, spiraling or knitting, using synthetic fibers such as nylon fiber, polyester fiber or aramid fiber, or natural fiber such as cotton fiber.

Figure 4:
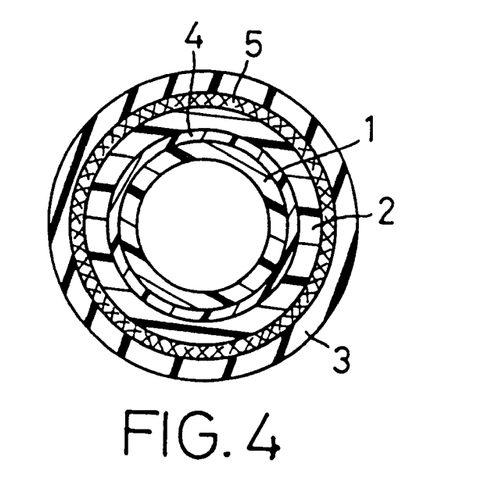
FIG. 4 is a cross sectional view showing still another embodiment of the fuel transporting hose of the present invention.

A further embodiment of the fuel transporting hose of the invention is illustrated in FIG. 4, wherein the adhesive layer 4 is provided between the inner layer 1 and the intermediate layer 2, while the reinforcing layer 5 is provided between the intermediate layer 2 and the outer layer 3 made of a rubber material. The adhesive layer 4 and the reinforcing layer 5 are formed in the same manners as described above, using the above-described materials.

The adhesive strength between the inner layer 1 and the intermediate layer 2 may be improved by subjecting the surface of the inner layer 1 to a suitable adhesive surface treatment, rather than by forming the adhesive layer 4 as described above. The adhesive surface treatment may be selected from: flame treatment; corona discharge method; sputtering; sodium treatment in which the surface of the layer 1 is activated by removing fluorine therefrom; and plasma treatment.

The fuel transporting hose for use in a fuel pipe system of an automobile may consist of a resin tube which has at least an inner layer formed of a fluorine-contained resin, and an outer layer formed of a polyamide or polyester resin. For producing the resin tube, any one of various known resin materials may be used as the fluorine-contained resin for the inner layer, or as the polyamide or polyester resin for the outer layer.

For example, the fluorine-contained resin may be selected from copolymers such as: polyvinylidene fluoride (PVDF); polychlorotrifluoroethylene (CTFE); a copolymer of ethylene and tetrafluoroethylene (ETFE); a copolymer of ethylene and polychlorotrifluoroethylene (ECTFE); a copolymer of hexafluoropropylene and tetrafluoroethylene (FEP); and fluorinated alkoxyethylene resin (PFA), and various graft polymers, and blends thereof.

Either aliphatic polyamide or aromatic polyamide may be used as the polyamide resin for the outer layer. The polyamide resin may be suitably selected from: a polymer of lactam; a condensate of diamine and dicarboxylic acid; a polymer of amino acid; copolymers and blends of these substances. Specific examples of such polyamide resin include nylon 6, nylon 66, nylon 610, nylon 612, nylon 11, and nylon 12. The outer layer of the tube may be also formed of polyester resin such as polybutylene terephthalate (PBT).

It is to be understood that the fluorine-contained resin and the polyamide or other resin as indicated above may contain as needed various known additives and/or agents for giving desired properties to the resin material. Each of the fluorine-contained resin and the polyamide or other resin is uniformly kneaded at a temperature around the melting point of the resin, and extruded using a generally used two-axis screw extruder, for example, by a known extrusion molding technique, so as to form a tubular resin body. This tubular body may be formed using a suitable mandrel, so as to obtain a tube having a specified inside diameter. It is also possible to form the tube without using the mandrel.

According to the method of the present invention, the inner layer is first formed of the fluorine-contained resin, and the outer surface of the inner layer which is to contact the outer layer is then subjected to a suitable surface treatment. The surface treatment may be selected from various known methods such as sodium treatment, flame treatment, corona discharge method; sputtering; and plasma treatment. To effect the sodium treatment, for example, the inner layer formed by extrusion as described above is first immersed in a chemical treatment liquid containing sodium-ammonia complex or sodium-naphthalene complex, so that a suitable active group (substituent) is introduced into the outer surface of the inner layer. Thereafter, the inner layer is immersed in methanol, and then in water, whereby the surface of the inner layer is cleaned. Then, the inner layer is dried and the sodium treatment is thus completed. After effecting the adhesive surface treatment, the outer surface of the inner layer may be coated with an adhesive as needed.

Subsequently, the outer layer is formed in lamination on the outer surface of the inner layer which has been treated in the manner as described above. The outer layer is formed of a resin such as polyamide or polyester, which has a poor adhesive property with respect to the fluorine-contained resin. The thickness of each of the inner and outer layers is suitably determined depending upon the specific application or utility of the tube. When the instant resin tube is used in a fuel pipe system of an automobile, for example, it is preferable that the inner layer has a thickness of about 0.05–0.5 mm, and the inner and outer layers have a total thickness of about 1.0 mm.

With the inner and outer layers laminated on each other, the tube is subjected to a heat treatment in which the inner and outer layers are heated at a temperature in a range of 150° C. to a melting point of the outer layer. If the heating temperature is lower than 150° C., the heat treatment does not yield a satisfactory effect of improving the adhesive strength between the inner and outer layers. If the temperature is higher than the melting point of the resin for the outer layer, the tube is undesirably softened during the heat treatment. Where the outer layer is formed of polyamide resin having a melting point of about 200° C.–210° C., the heating temperature is preferably controlled to be not higher than about 180° C., since the polyamide resin begins to soften little by little as the temperature reaches about 180° C. or higher. While the heat treatment time or heating time may be suitably determined depending upon the heating temperature, a further improvement in the effect of the heat treatment cannot be expected if the heating time exceeds four hours.

The present resin tube, which is subjected to the heat treatment as well as the adhesive surface treatment, ensures a significantly enhanced adhesive strength between the inner and outer layers, as compared with a known resin tube which is subjected only to the adhesive surface treatment. Accordingly, peeling or separation of the inner and outer layers is not likely to occur, and the resin tube exhibits a comparatively high bending stability, and comparatively high durability with respect to vibrations, bending forces or the like. Further, the present resin tube does not suffer from gas accumulation at the interface of the inner and outer layers, and is therefore effectively prevented from bursting. Since the heat treatment can be easily carried out at a relatively low cost, the process of producing the resin tube may readily include the step for the heat treatment, without lowering the production efficiency and pushing up the manufacturing cost.

On the outer surface of the double-layered resin tube thus obtained, there may be formed a protective layer which is a solid body or a foam body made of a rubber material, such as: chloroprene rubber (CR); ethylene-propylene-diene rubber (EPDM); epichlorohydrin rubber (ECO); chlorinated polyethylene (CPE); acrylic rubber (ACM); chlorosulphonated polyethylene (CSM); and silicone rubber (Q), or of a thermoplastic resin, such as polyvinyl chloride resin (PVC), or a thermoplastic elastomer or the like. The composition used for the protective layer may contain a fire-retardant material in addition to the above-indicated material. This protective layer is usually formed on the outer layer in thickness of about 0.5–3 mm, after the above-described double-layered resin tube is subjected to the heat treatment. In this regard, a suitable adhesive may be provided as needed between the protective layer and the outer resin layer.

EXAMPLES

To clarify the concept of the present invention, there will be hereinafter described in detail some examples of the fuel transporting hose and the resin tube according to the present invention. It is to be understood that the present invention is by no means limited to the details of these examples, but may be embodied with various changes, modifications and improvements which may occur to those skilled in the art, without departing from the spirit and scope of the invention defined in the appended claims.

Examples 1, 2

According to the method as described above, two three-layered fuel transporting hoses (having an inside diameter of 6 mm) for use in a fuel pipe system of an automobile were produced as Examples 1 and 2, using the materials as indicated in TABLE 1 below.

TABLE 1

|  |  | Example 1 | Example 2 |
|---|---|---|---|
| Inner layer | Material | PVDF | CTFE |
|  | Thickness(mm) | 0.2 | 0.1 |
| Intermediate layer | Material | Nylon 12 | PBT |
|  | Thickness(mm) | 0.8 | 1.0 |
| Outer layer | Material | ECO | CSM |
|  | Thickness(mm) | 2.0 | 2.0 |

Example 3

A fuel transporting hose constructed as shown in FIG. 2 and having an inside diameter of 6 mm was produced as Example 3, in the same manner as Example 1 except that an adhesive layer was formed between the inner layer and the intermediate layer. The adhesive layer was formed by a known method, using an adhesive formed of a mixture of fluorine-contained resin (PVDF) and nylon.

Example 4

A fuel transporting hose constructed as shown in FIG. 3 and having an inside diameter of 6 mm was produced as Example 4, in the same manner as Example 1 except that a reinforcing layer was formed by spiraling nylon fibers, between the intermediate layer and the outer layer.

Example 5

A fuel transporting hose constructed as shown in FIG. 4 and having an inside diameter of 6 mm was produced as Example 5, in the same manner as Example 1 except that an adhesive layer was formed between the inner and intermediate layers while a reinforcing layer was formed between the intermediate and outer layers. The adhesive layer was formed by a known method, using an adhesive formed of a mixture of fluorine-contained resin (PVDF) and nylon. The reinforcing layer was formed by spiraling nylon fibers.

Comparative Example 1

A two-layered tubular structure was produced by extruding an innermost layer and an intermediate layer at a time by an extruder, using the materials as indicated in TABLE 2 below. Then, a reinforcing layer consisting of a brass-plated wire was formed on the outer surface of the intermediate layer by a known method. Then, an outermost layer made of the material indicated in TABLE 2 was formed on the outer surface of the reinforcing layer, so as to provide a four-layered hose as Comparative Example 1.

TABLE 2

|  |  | Comparative Example 1 |
|---|---|---|
| Innermost layer | Material | Fluorine-contained resin |
|  | Thickness(mm) | 0.2 |
| Intermediate layer | Material | EPDM |
|  | Thickness(mm) | 1.0 |
| Reinforcing layer | Material | Brass-plated wire |
|  | Thickness(mm) | 0.4–0.6 |
| Outermost layer | Material | CSM |
|  | Thickness(mm) | 1.5 |

With respect to the above-indicated hoses of Examples 1–5 and Comparative Example 1, measurements and evaluation were conducted with regard to bursting pressure, gasoline impermeability, resistance to sour gasoline, and flame resistance. The results are indicated in TABLE 3 and TABLE 4. The bursting pressure and other properties of each specimen of the hoses were measured and evaluated in the following manners.

[Bursting Pressure]

A pressure (hydraulic pressure) applied to each specimen of the hoses was continuously increased until the hose burst, and the maximum pressure was measured at which the burst of the hose occurred or water leaked from the hose through pin-holes.

[Gasoline Impermeability]

Two kinds of gasoline, i.e., a test gasoline and a mixed gasoline which is a 50:50 volume blend of the test gasoline and methanol were prepared. The test gasoline and mixed gasoline were sealed into respective specimens of the hoses, which were then left at a temperature of 40° C., and the amount of reduction in the weight of the gasoline (g/m² per day) was measured. The same measurement was conducted on a conventional hose which has the same inside diameter as the above specimens, and includes an inner layer made of fluororubber (FKM), an intermediate layer made of ECO, an outer layer made of ECO and formed outwardly of the intermediate layer, and a reinforcing layer consisting of a reinforcing fiber and formed between the intermediate layer and the outer layer. The measurement result of the conventional hose is used as a reference value "1", and the measurement results, that is, gasoline impermeability values of Examples 1–5 and Comparative Example 1 are indicated on the basis of the reference value in TABLE 3 and TABLE 4.

[Resistance to sour gasoline]

The sour gasoline containing peroxides was circulated through each specimen of the hoses, and any crack or other abnormality which appeared in the inner surface of the hose was recognized. The circulation of the sour gasoline was effected at 40–60° C., under a pressure of 2.5 kgf/cm². In the TABLES, "⊚" indicates that no abnormality was recognized in the specimen, and "O" indicates that almost no abnormality was recognized, while "X" indicates that some abnormality was recognized.

Each specimen of the hoses was subjected to a pneumatic pressure of 3–4 kgf/cm², and a flame of 700–800° C. was brought into contact with the thus pressurized hose. The length of time from the contact of the flame and hose to the burst of the hose was measured. In the TABLES, "O" indicates that the time was longer than that measured with respect to a known hose, and "X" indicates that the time was similar to that measured for the known hose.

TABLE 3

|  | Example | | |
| --- | --- | --- | --- |
|  | 1 | 2 | 3 |
| Bursting Pressure (kgf/cm²) | 80–100 | 100–120 | 80–100 |
| Gasoline Impermeability Test gasoline | 0.5 or less | 0.5 or less | 0.5 or less |
| Mixed gasoline | 0.5 or less | 0.5 or less | 0.5 or less |
| Resistance to sour gasoline | ⊚ | ⊚ | ⊚ |
| Flame resistance | ○ | ○ | ○ |

TABLE 4

|  | Example | | Comparative |
| --- | --- | --- | --- |
|  | 4 | 5 | Example 1 |
| Bursting Pressure (kgf/cm²) | 100–120 | 100–120 | 200 or higher |
| Gasoline Impermeability Test gasoline | 0.5 or less | 0.5 or less | 0.5 or less |
| Mixed gasoline | 0.5 or less | 0.5 or less | 0.5 or less |
| Resistance to sour gasoline | ⊚ | ⊚ | ⊚ |
| Flame resistance | ○ | ○ | X |

It will be understood from TABLE 3 and TABLE 4 that Comparative Example 1 has a poor flame resistance, and that any one of Examples 1–5 has excellent properties in respect of the gasoline impermeability, the resistance to sour gasoline and the flame resistance. Further, such excellent properties can be achieved even with the fluorine-contained resin layer as the inner layer having a relatively small thickness. This leads to a reduced amount of expensive fluorine-contained resin to be used, permitting reduction in the cost of manufacture of the hose.

Examples 6–8

According to the method as described above, three-layered fuel transporting hoses (having an inside diameter of 6 mm) for use in a fuel pipe system of an automobile were produced as Examples 6, 7 and 8, using the materials as indicated in TABLE 5 and TABLE 6 below. The fluorine-contained resin used for the inner layer was mixed with carbon black which serves as the electrically conductive additive, whose content is also indicated in the TABLES.

TABLE 5

|  |  | Example 6 | Example 7 |
| --- | --- | --- | --- |
| Inner layer | Material | PVDF | PVDF |
|  | Carbon black | Medium-purity | High-purity |
|  | Content *1 (parts) | 12 | 8 |
|  | Volume resistivity (Ω · cm) | 4.2 × 10⁶ | 5.5 × 10⁴ |
|  | Thickness(mm) | 0.2 | 0.2 |

TABLE 5-continued

|  |  | Example 6 | Example 7 |
| --- | --- | --- | --- |
| Intermediate layer | Material | Nylon 12 | Nylon 12 |
|  | Thickness(mm) | 0.8 | 0.8 |
| Outer layer | Material | ECO | ECO |
|  | Thickness(mm) | 2.0 | 2.0 |

*1: parts by weight per 100 parts by weight of fluorine-contained resin

TABLE 6

|  |  | Example 8 |
| --- | --- | --- |
| Inner layer | Material | CTFE |
|  | Carbon black | High-purity |
|  | Content *1 (parts) | 8 |
|  | Volume resistivity (Ω · cm) | 3.8 × 10⁴ |
|  | Thickness(mm) | 0.1 |
| Intermediate layer | Material | PBT |
|  | Thickness(mm) | 1.0 |
| Outer layer | Material | ECO |
|  | Thickness(mm) | 2.0 |

*1: parts by weight per 100 parts by weight of fluorine-contained resin

Example 9

A fuel transporting hose constructed as shown in FIG. 2 and having an inside diameter of 6 mm was produced as Example 9, in the same manner as Example 6 except that an adhesive layer was formed between the inner layer and the intermediate layer. The adhesive layer was formed by a known method, using an adhesive which consists of a mixture of fluorine-contained resin (PVDF) and nylon.

Example 10

A fuel transporting hose constructed as shown in FIG. 3 and having an inside diameter of 6 mm was produced as Example 10, in the same manner as Example 1 except that a reinforcing layer was formed by spiraling nylon fibers, between the intermediate layer and the outer layer.

Example 11

A fuel transporting hose constructed as shown in FIG. 4 and having an inside diameter of 6 mm was produced as Example 11, in the same manner as Example 1 except that an adhesive layer was formed between the inner and intermediate layers while a reinforcing layer was formed between the intermediate and outer layers. The adhesive layer was formed by a known method, using an adhesive that is a mixture of fluorine-contained resin (PVDF) and nylon. The reinforcing layer was formed by spiraling nylon fibers.

Comparative Example 2

A single-layered hose was produced as Comparative Example 2, by extruding a material as indicated in TABLE 7 below, by a suitable extruder.

Comparative Example 3

Initially, an inner layer was formed by extruding a material as indicated in TABLE 7. Then, a reinforcing layer which consists of a wire is formed by braiding on the outer surface of the inner layer, according to a known method. Thus, a two-layered hose as Comparative Example 3 was produced.

TABLE 7

|  |  | Comparative Example | |
|---|---|---|---|
|  |  | 2 | 3 |
| Inner layer | Material | Nylon | F-contained resin *1 |
|  | Thickness(mm) | 1.0 | 0.7 |
| Reinforcing layer | Material | — | Brass-plated wire |
|  | Thickness(mm) | — | 1.0 |

*1: Fluorine-contained resin

With respect to the above-indicated hoses of Examples 6–11 and Comparative Examples 2 and 3, measurements and evaluation were conducted with regard to bursting pressure, gasoline impermeability, resistance to sour gasoline, and resistance to firing. The results are indicated in TABLE 8–10. The bursting pressure and other properties of the hoses were measured and evaluated in the following manners.

[Bursting Pressure]

A pressure (hydraulic pressure) applied to each specimen of the hoses was continuously increased until the hose burst, and the maximum pressure was measured at which the burst of the hose occurred or water leaked from the hose through pin-holes.

[Gasoline Impermeability]

Two kinds of gasoline, i.e., a test gasoline and a mixed gasoline which is a 50:50 volume blend of the test gasoline and methanol were prepared. The test gasoline and mixed gasoline were sealed into respective specimens of the hoses, which were then left at a temperature of 40° C., and the amount of reduction in the weight of the gasoline (g/m² per day) was measured. The same measurement was conducted on a conventional hose which has the same inside diameter as the above specimens, and includes an inner layer made of fluororubber (FKM), an intermediate layer made of ECO, an outer layer made of ECO and formed outwardly of the intermediate layer, and a reinforcing layer consisting of a reinforcing fiber and formed between the intermediate layer and the outer layer. The measurement result of the conventional hose is used as a reference value "1", and the measurement results, i.e., gasoline impermeability values of Examples 6–11 and Comparative Examples 2 and 3 are indicated on the basis of the reference value in TABLE 8–10.

[Resistance to sour gasoline]

The sour gasoline containing peroxides was circulated through each specimen of the hoses, and any crack or other abnormality which appeared in the inner surface of the hose was recognized. The circulation of the sour gasoline was effected at 40–60° C., under a pressure of 2.5 kgf/cm². In TABLE 9–11, "⊚" indicates that no abnormality was recognized in the specimen, and "O" indicates that almost no abnormality was recognized, while "X" indicates that some abnormality was recognized.

[Electrical resistance]

The volume resistivity (Ω•cm) of each specimen of the hose was measured according to JIS (Japanese Industrial Standard) (K-6911).

[Resistance to firing]

A metallic needle was brought close to each specimen of the hoses to which an electrical charge of 30–50 kV was applied, and spark phenomena were observed.

TABLE 8

|  | Example | | |
|---|---|---|---|
|  | 6 | 7 | 8 |
| Bursting Pressure (kgf/cm²) | 80–100 | 80–100 | 100–120 |
| Gasoline Impermeability Test gasoline | 0.5 or less | 0.5 or less | 0.5 or less |
| Mixed gasoline | 0.5 or less | 0.5 or less | 0.5 or less |
| Resistance to sour gasoline | ⊚ | ⊚ | ⊚ |
| Volume resistivity (Ω · cm) | 4.2 × 10⁶ | 5.5 × 10⁴ | 3.8 × 10⁴ |
| Resistance to firing | ⊚ | ⊚ | ⊚ |

TABLE 9

|  | Example | | |
|---|---|---|---|
|  | 9 | 10 | 11 |
| Bursting Pressure (kgf/cm²) | 80–100 | 100–200 or higher | 100–200 or higher |
| Gasoline Impermeability Test gasoline | 0.5 or less | 0.5 or less | 0.5 or less |
| Mixed gasoline | 0.5 or less | 0.5 or less | 0.5 or less |
| Resistance to sour gasoline | ⊚ | ⊚ | ⊚ |
| Volume resistivity (Ω · cm) | 4.3 × 10⁶ | 4.1 × 10⁶ | 4.2 × 10⁶ |
| Resistance to firing | ⊚ | ⊚ | ⊚ |

TABLE 10

|  | Comparative Example | |
|---|---|---|
|  | 2 | 3 |
| Bursting Pressure (kgf/cm²) | 80–100 | 200 or higher |
| Gasoline Impermeability Test gasoline | 0.5–1 | 0.5 or less |
| Mixed gasoline | 10–15 | 0.5 or less |
| Resistance to sour gasoline | Δ | ⊚ |
| Volume resistivity (Ω · cm) | 1.4 × 10¹⁴ | 1.5 × 10¹⁵ or higher |
| Resistance to firing | X | X |

It will be understood from TABLE 8–10 that Comparative Examples 2 and 3 are inferior in the resistance to firing, and that any one of Examples 6–11 has excellent properties in respect of the gasoline impermeability and the resistance to sour gasoline. Further, Examples 6–11 have a sufficiently high strength, and therefore ensure high degrees of wear resistance and shock resistance. Since the inner layer was formed of the fluorine-contained resin having the volume resistivity of not higher than $10^{10}\Omega$•cm, the hoses of Examples 6–11 are also excellent in the resistance to firing. Moreover, such excellent properties of Examples 6–11 can be achieved even with the fluorine-contained resin layer as the inner layer having a relatively small thickness. This leads to a reduced amount of expensive fluorine-contained resin to be used, permitting reduction in the cost of manufacture of the hose.

Examples 12–26

Fifteen examples of double-layered resin tubes were prepared by using various resin materials as indicated in TABLE 11. For forming each example, the inner layer was first formed by known extrusion molding, and the surface of the inner layer was then subjected to sodium treatment according to an ordinary method. Then, the outer layer was formed in lamination on the inner layer. The thus obtained resin tube of each example has an inside diameter of 6 mm and an outside diameter of 8 mm, and the thicknesses of the inner layer and the outer layer are 0.3 mm and 0.7 mm, respectively. The resin tubes of Example Nos. 13–22, 24 and 26 were then subjected to the heat treatment under respective conditions as indicated in TABLE 11.

Subsequently, a specimen of 1 inch in width was picked or taken out of each of the above examples of the resin tube, and the 180-degree peeling test (adhesion test or friction test) according to JIS (Japanese Industrial Standard)-K-6301 was conducted on each specimen so as to measure the peeling strength of the specimen. The results of the test are also indicated in TABLE 11.

In TABLE 11, the fluorine-contained resins used for the inner layers and the polyamide or other resins used for the outer layers are abbreviated as follows:

ETFE: copolymer of ethylene and tetrafluoroethylene
FEP: copolymer of hexafluoropropylene and tetrafluoroethylene
PFA: alkoxyethylene fluoride ethylene resin
PA12: nylon 12
PA11: nylon 11
PBT: polybutylene terephthalate

TABLE 11

| Example No. | 12 | 13 | 14 | 15 | 16 | 17 | 18 |
|---|---|---|---|---|---|---|---|
| Inner layer | | | ETFE | | | ETFE | |
| Outer layer | | | PA12 | | | PA12 | |
| Heat Temp. (° C.) | — | | 150 | | | 170 | |
| treatment Time (hr.) | — | 0.5 | 2 | 4 | 0.5 | 2 | 4 |
| Peel strength (kgf/25 mm) | =0 | 0.8 | 2.0 | 2.2 | 3.6 | 4.2 | 4.6 |

| Example No. | 19 | 20 | 21 | 22 | 23 | 24 | 25 | 26 |
|---|---|---|---|---|---|---|---|---|
| Inner layer | | ETFE | | FEP | | ETFE | | PFA |
| Outer layer | | PA12 | | PA12 | | PBT | | PA11 |
| heat Temp. (° C.) | | 180 | | 170 | — | 170 | — | 170 |
| treatment Time (hr.) | 0.5 | 2 | 4 | 0.5 | — | 0.5 | — | 0.5 |
| Peel strength (kgf/25 mm) | 3.9 | 4.4 | 4.9 | 4.5 | 3.6 | 4.0 | =0 | 4.1 |

It will be understood from TABLE 11 that the resin tubes of Comparative example No. 12, No. 23 and No. 25, which had only the adhesive surface treatment effected on their inner layers, exhibit a relatively low peel strength, which is likely to incur peeling or separation of the inner and outer layers. On the other hand, the resin tubes of Example Nos. 13–22, 24 and 26 according to the present invention, which were subjected to the heat treatment as well as the adhesive surface treatment, exhibit an effectively improved peel strength.

What is claimed is:

1. A fuel transporting hose for use in a fuel pipe system, comprising:
   an inner layer comprising a fluorine-containing resin;
   an intermediate layer comprising a synthetic resin other than the fluorine-containing resin and being formed on an outer surface of said inner layer; and
   an outer layer comprising a rubber material and being formed on an outer surface of said intermediate layer, said inner layer having a thickness of 50 $\mu$m to 0.5 mm, said intermediate layer having a thickness of 0.5 mm to 1.5 mm, said outer layer having a thickness of 0.5 mm to 5 mm.

2. A fuel transporting hose as defined in claim 1, wherein said fluorine-containing resin of said inner layer is selected from the group consisting of: polyvinylidene fluoride (PVDF); polychlorotrifluoroethylene (CTFE); a copolymer of ethylene and chlorotrifluoroethylene (ECTFE); a copolymer of ethylene and tetrafluoroethylene (ETFE); a copolymer of hexafluoropropylene and tetrafluoroethylene (FEP); fluorinated alkoxyethylene resin (PFA); and polytetrafluoroethylene (PTFE).

3. A fuel transporting hose as defined in claim 1, wherein said fluorine-containing resin contains an electrically conductive additive dispersed therein, said inner layer having a volume resistivity of not higher than $10^{10}\Omega \cdot$cm.

4. A fuel transporting hose as defined in claim 3, wherein said inner layer contains 3–16 parts by weight of said electrically conductive additive, per 100 parts by weight of the fluorine-containing resin.

5. A fuel transporting hose as defined in claim 3, wherein said electrically conductive additive is carbon black or stainless steel fibers.

6. A fuel transporting hose as defined in claim 1, wherein said synthetic resin of said intermediate layer is a polyamide resin which is selected from the group consisting of nylon 6, nylon 11, nylon 12, nylon 610, nylon 612, and a blend of nylon 11 or nylon 12 and nylon 66.

7. A fuel transporting hose as defined in claim 1, wherein said synthetic resin of said intermediate layer is a polyester resin which is formed by condensation polymerization of diol and dicarboxylic acid.

8. A fuel transporting hose as defined in claim 7, wherein said polyester resin is polybutylene terephthalate (PBT) which is a condensation polymer of 1,4-butanediol and terephthalic acid.

9. A fuel transporting hose as defined in claim 1, wherein said rubber material of said outer layer is selected from the group consisting of: ECO; CSM; chlorinated polyethylene rubber (CPE); acrylic rubber (ACM); chloroprene rubber (CR); a blend of NBR and polyvinyl chloride resin (PVC); EPDM; isobutylene-isoprene rubber (IIR); and halogenated butyl rubber.

10. A fuel transporting hose as defined in claim 1, further comprising an adhesive layer formed between said inner layer and said intermediate layer.

11. A fuel transporting hose as defined in claim 1, further comprising a reinforcing fiber layer formed between said intermediate layer and said outer layer.

12. A fuel transporting hose as defined in claim 1, further comprising an adhesive layer formed between said inner layer and said intermediate layer, and a reinforcing fiber layer formed between said intermediate layer and said outer layer.

13. A fuel transporting hose as defined in claim 1, wherein said inner layer is subjected to a surface treatment which is selected from the group consisting of: flame treatment; corona discharge method; sputtering; sodium treatment in which a surface of said inner layer is activated by removing fluorine therefrom; and plasma treatment.

14. A fuel transporting hose as defined in claim 1, wherein said inner layer is electrically conductive such that an electrical conductivity is given to at least a surface of said inner layer which is adapted to contact a fuel being transported through the hose.

15. A fuel transporting hose as defined in claim 14, wherein said inner layer has a volume resistivity of not higher than $10^{10}\Omega \cdot$cm.

16. A fuel transporting hose as defined in claim 14, wherein said inner layer comprises said fluorine-containing resin in which an electrically conductive additive is dispersed.

17. A fuel transporting hose as defined in claim 16, wherein said inner layer contains 3–16 parts by weight of said electrically conductive additive per 100 parts by weight of said fluorine-containing resin.

18. A resin tube for use in a fuel pipe system, comprising:

an inner layer comprising a fluorine-containing resin;

an outer layer comprising a synthetic resin other than said fluorine-containing resin and being formed on an outer surface of said inner layer; and a protective layer comprising a material selected from the group consisting of a rubber, a thermoplastic resin, and a thermoplastic elastomer, and being formed on an outer surface of said outer layer, said inner layer being electrically conductive such that an electrical conductivity is given to at least a surface of said inner layer which is adapted to contact a fuel being transmitted through the tube, said outer surface of said inner layer on which said outer layer is formed being subjected to a surface treatment which is selected from the group consisting of sodium treatment, flame treatment, corona discharge method, sputtering, and plasma treatment.

19. A resin tube as defined in claim 18, wherein said fluorine-containing resin of said inner layer is selected from the group consisting of: polyvinylidene fluoride (PVDF); polychlorotrifluoroethylene (CTFE); a copolymer of ethylene and chlorotrifluoroethylene (ECTFE); a copolymer of ethylene and tetrafluoroethylene (ETFE); a copolymer of hexafluoropropylene and tetrafluoroethylene (FEP); fluorinated alkoxyethylene resin (PFA); and polytetrafluoroethylene (PTFE).

20. A resin tube as defined in claim 18, wherein said fluorine-containing resin contains an electrically conductive additive dispersed therein, said inner layer having a volume resistivity of not higher than $10^{10} \Omega \cdot cm$.

21. A resin tube as defined in claim 18, wherein said inner layer contains 3–16 parts by weight of said electrically conductive additive, per 100 parts by weight of the fluorine-containing resin.

22. A resin tube as defined in claim 18, further comprising an adhesive layer formed between said inner layer and said outer layer.

23. A resin tube as defined in claim 18, wherein said synthetic resin of said outer layer is a polyamide or polyester resin which is selected from the group consisting of nylon 6, nylon 11, nylon 12, nylon 610, nylon 612, a blend of nylon 11 or nylon 12 and nylon 66, and polybutylene terephthalate (PBT).

24. A fuel transporting hose for use in a fuel pipe system, comprising:

an inner layer comprising a fluorine-containing resin in at least a portion of which an electrically conductive additive is dispersed;

an intermediate layer comprising a synthetic resin other than the fluorine-containing resin and being formed on an outer surface of said inner layer; and an outer layer being formed on an outer surface of said intermediate layer, said inner layer having thickness of 50 μm to 0.5 mm, said intermediate layer having a thickness of 0.5 mm to 1.5 mm.

25. A fuel transporting hose as defined in claim 24, wherein said inner layer has a volume resistivity of not higher than $10^{10} \Omega \cdot cm$.

26. A fuel transporting hose as defined in claim 24, wherein said inner layer contains 3 to 16 parts by weight of said electrically conductive additive per 100 parts by weight of the fluorine-containing resin.

* * * * *